(12) United States Patent
Voudouris et al.

(10) Patent No.: US 12,213,859 B2
(45) Date of Patent: Feb. 4, 2025

(54) CLEAR PLASTIC ALIGNER WITH CONFIGURABLE PROTRUSIONS FOR ANTERIOR OR OPEN BITE TREATMENT AND MATTRESS PLASTIC MATERIAL FOR INVISIBLE ALIGNERS

(71) Applicant: Spartan Orthodontics Inc., Toronto (CA)

(72) Inventors: John Voudouris, Toronto (CA); John Dean Voudouris, Toronto (CA)

(73) Assignee: Spartan Orthodontics Inc., Toronto (CA)

( * ) Notice: Subject to any disclaimer, the term of this patent is extended or adjusted under 35 U.S.C. 154(b) by 0 days.

(21) Appl. No.: 18/123,906

(22) Filed: Mar. 20, 2023

(65) Prior Publication Data

US 2024/0024078 A1    Jan. 25, 2024

Related U.S. Application Data

(63) Continuation-in-part of application No. 16/610,799, filed as application No. PCT/CA2018/000081 on Apr. 30, 2018, now Pat. No. 11,612,456.

(60) Provisional application No. 62/500,840, filed on May 3, 2017.

(51) Int. Cl.
*A61C 7/08* (2006.01)
(52) U.S. Cl.
CPC ..................................... *A61C 7/08* (2013.01)
(58) Field of Classification Search
CPC .... A61C 7/00; A61C 7/08; A61C 7/36; A63B 23/03; A63B 23/032; A61F 5/56; A61F 5/50; A61F 5/566; A61F 5/58; A61F 5/0016; A61F 2005/563
USPC ....................... 433/6, 18, 19, 24, 203.1, 223
See application file for complete search history.

(56) References Cited

U.S. PATENT DOCUMENTS

| | | | | |
|---|---|---|---|---|
| 4,608,974 A * | 9/1986 | Sicurelli, Jr. | ............. | A61F 5/00 128/869 |
| 2004/0209218 A1 * | 10/2004 | Chishti | ............ | A61C 7/36 433/7 |
| 2010/0266976 A1 * | 10/2010 | Song | ............ | A61C 7/14 433/8 |
| 2011/0020761 A1 * | 1/2011 | Kalili | ............ | A61C 7/08 433/214 |
| 2013/0298916 A1 * | 11/2013 | Alvarez | ............ | A61C 5/90 264/16 |

* cited by examiner

*Primary Examiner* — Ralph A Lewis
*Assistant Examiner* — Mirayda A Aponte
(74) *Attorney, Agent, or Firm* — McMillan LLP

(57) ABSTRACT

Protrusions or holes with jagged edges formed on the lingual side of invisible aligner trays are provided. The protrusions or holes include two components and serve to irritate the tongue causing it to retract away from the incisors thus eliminating intruding force otherwise exerted by the tongue. A clear corrugated material is provided which is suited for making the aligner trays having the protrusions which otherwise would be difficult with standard thick material used. The lingual side protrusions are added by computer to the impressions taken from a patient's teeth such that the protrusions are formed on the dental model used to make the aligner trays.

12 Claims, 30 Drawing Sheets

CLEAR PLASTIC ALIGNER WITH CONFIGURABLE PROTRUSIONS FOR ANTERIOR OR OPEN BITE TREATMENT AND MATTRESS PLASTIC MATERIAL FOR INVISIBLE ALIGNERS

RELATED APPLICATIONS

This application is a continuation-in-part of U.S. application Ser. No. 16/610,799 which claims priority from U.S. Provisional Patent Application No. 62/500,840 (which this application also claims priority from) filed May 3, 2017; the contents of each of which are herein expressly incorporated by reference in their entirety.

FIELD OF THE INVENTION

The present invention relates generally to orthodontic appliances. More specifically the present invention relates to protrusions formed on clear plastic aligners, for anterior or open bite treatment, and a process of making plaster aligner trays containing the protrusions. In addition, the present invention relates to mattress plastic material used in making invisible aligners containing protrusions.

BACKGROUND OF THE INVENTION

Invisible aligner trays which are elastic positioning appliances for aligning teeth such as the one shown in FIG. 1A, are known. Such appliances comprise a thin shell of elastic material that generally conforms to a patient's teeth but is slightly out of alignment with the initial tooth configuration. Placement of the aligner tray over the teeth, as seen in FIG. 1B, applies controlled forces in specific locations to gradually move the teeth into the new configuration. Repetition of this process with successive appliances comprising new configurations eventually move the teeth through a series of intermediate configurations to a final desired configuration.

Anterior open bite malocclusion is one of the most difficult conditions to treat. Firstly, the tongue unnaturally thrusts or positions forward between the upper and lower incisors to try to establish a seal between the lips for swallowing and eating approximately 600-1000 times per day. This results in the intrusion of the upper and lower incisors away from each other rather than having the normal 20% overlap over each of the upper and lower incisors when the dentition is together during chewing for instance. Second, the tongue has one of the strongest sets of muscles in the human body capable of intruding the upper and lower front six incisors significantly, and of causing the open bite to be resistant to natural closure. As a consequence this makes anterior or lateral open bites difficult to close especially with invisible aligner trays alone since the aligner trays cover the teeth and tend to promote intrusion of the incisors themselves.

In a related matter, it has been difficult to make invisible clear vacuum-formed (also known as thermal formed) retainer aligners to straighten teeth with standard flat clear approximately 1 mm thick Essix® material. The steps shown in FIGS. 2A-2E depict some steps of forming an invisible aligner tray from Essix® material. First, a dental model is created. An in-office 3D scan of the teeth (using an intraoral scanner "3D Shape" for instance) may pre-straighten the teeth by 0.25 mm increments to make the corrected, printed resin dental model. In FIG. 2A, the dental model 202 is placed in the center of the base of a machine 204. The standard flat clear sheet of approximately 1 mm thick Essix® material is initially placed over resin or plaster dental models, heated to soften it, and vacuumed down over the dental model with a "suck-down" method. In FIG. 2B, the molded appliance is removed from the machine. In FIG. 2C using a heat knife 206, lab knife or trimming wheel the plastic is trimmed 1 to 3 mm above the gingival margin from both the lingual and labial surfaces. In FIG. 2D, the appliance is gently removed from the cast. The appliance is finally polished with polishing brushes 208 in FIG. 2E.

An orthodontist can freely make about 10 sets of resin models for Essix®—like upper and lower retainers to fully straighten mild crowding in an adult patient at a low cost. The process of creating an Essix® clear retainer is described in the document "How to Create an Essix® Clear Retainer"—Dentsply Raintree Essix®—RTE-018-13 Rev. 05/14 which contents are herein incorporated in their entirety by reference.

Essix® ACE Plastic, is thermoformed to fabricate intraoral appliances such as retainers, aligners for minor tooth movement, and temporary bridges. While flat clear sheets from Dentsply Essix® may be also used for tooth movement, the use encounters a problem. Solid Essix® material is too stiff and wears out in force to move teeth effectively, since it is not flexible enough.

SUMMARY OF THE INVENTION

In one aspect of the present invention, there is provided an orthodontic device for anterior or lateral open bite treatment. The orthodontic device comprises: a plastic aligner tray having a labial-buccal side, a lingual side, and a socket shaped to engage a patient's teeth formed between the lingual side and the labial side; and irritating means for the patient's tongue for preventing the tongue from thrusting against the incisors causing intrusion. The irritating means are formed in the aligner on the lingual side and facing the tongue. The irritating means comprises a first component configurable to form a second component. In another aspect, a tool is used to form the second component from the first component. In another aspect, the first component supports or at least partially surrounds the second component.

In one embodiment, the irritating means comprise at least one protrusion formed on the lingual side of the plastic aligner facing the tongue.

In one embodiment the protrusion is star-shaped. The star-shaped protrusion may comprise a plurality of wing members extending radially from a center thereof.

In one embodiment, the star-shaped protrusion comprises a horn member at a center thereof extending substantially lingually towards the patient's tongue.

In one embodiment, the star-shaped protrusion comprises a wedge member on a labial surface of at least one of the plurality of wing members.

In another embodiment, the at least one protrusion is cone-shaped having a lingual-facing apex.

In yet another embodiment, the least one protrusion is diamond-shaped.

In one embodiment, the diamond-shaped protrusion comprises a lingual-facing pointed edge.

In one embodiment, the diamond-shaped protrusion comprises a plurality of side pointed edges.

In another embodiment, the irritating means comprise at least one hole formed on the lingual side of the aligner tray, the at least one hole having a plurality of jagged edges.

In another aspect of the present invention, there is provided a flexible clear corrugated aligner material for use in making the orthodontic device, the material comprising a plurality of parallel corrugated sections joined to one another for providing flexibility when formed around a dental model.

In one embodiment, the flexible clear corrugated linear material further comprises a plurality of longitudinal gaps separating adjacent pairs of the parallel corrugated sections.

In one embodiment, the plurality of longitudinal gaps are centered like a barbell between the plurality of parallel corrugated sections.

In one embodiment, the corrugated sections are flattened prior to thermal forming over a resin or plaster dental model.

In yet another aspect of the present invention, there is provided a process for making a plastic aligner tray having lingual-facing protrusions, the process comprising: obtaining impressions of a patient's teeth and feeding the impressions into a computer for generating a dental model of the patient's teeth; modifying the impressions to add star, cone-shaped, or diamond-shaped protrusions thereto; generating a dental model of a patient's teeth, including the protrusions; and preparing an aligner tray on the dental model such that the aligner tray contains the protrusions.

In yet another aspect of the present invention, there is provided a process for making a plastic aligner tray having lingual-facing protrusions, the process comprising: obtaining impressions of a patient's teeth and feeding the impressions into a computer for generating a dental model of the patient's teeth; modifying the impressions to add a protrusion corresponding to a first component of the aligner configurable to form a second component; generating a dental model of a patient's teeth, including the first component; and preparing an aligner tray on the dental model such that the aligner tray contains the first component.

BRIEF DESCRIPTION OF THE DRAWINGS

An embodiment will now be described, by way of example only, with reference to the attached figures, wherein.

DETAILED DESCRIPTION OF THE EMBODIMENT

Figure 1A:
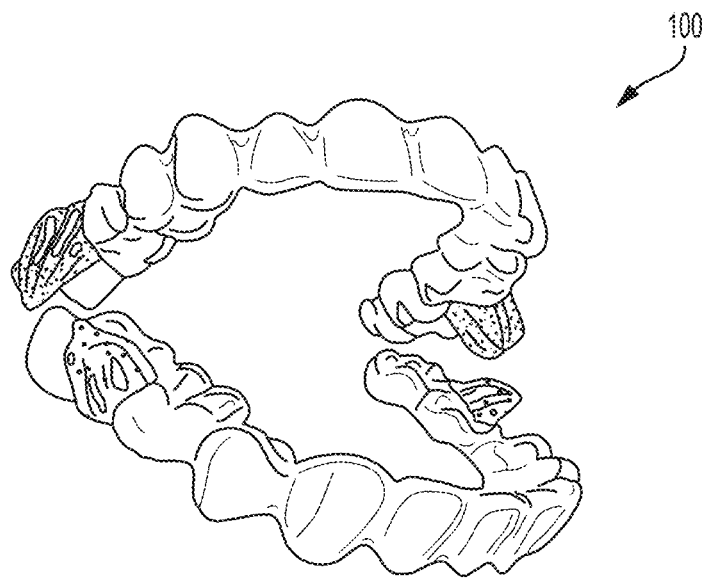
FIG. 1A is perspective view of a maxillary invisible aligner tray, and a mandibular invisible aligner tray.
Figure 1B:
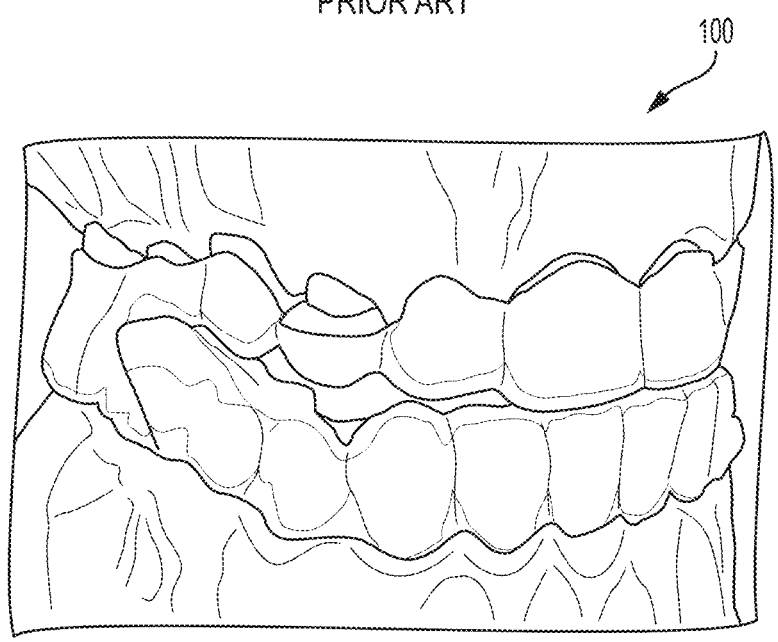
FIG. 1B is a perspective view of the invisible aligner trays of FIG. 1A applied to a patients teeth.
Figure 2A:
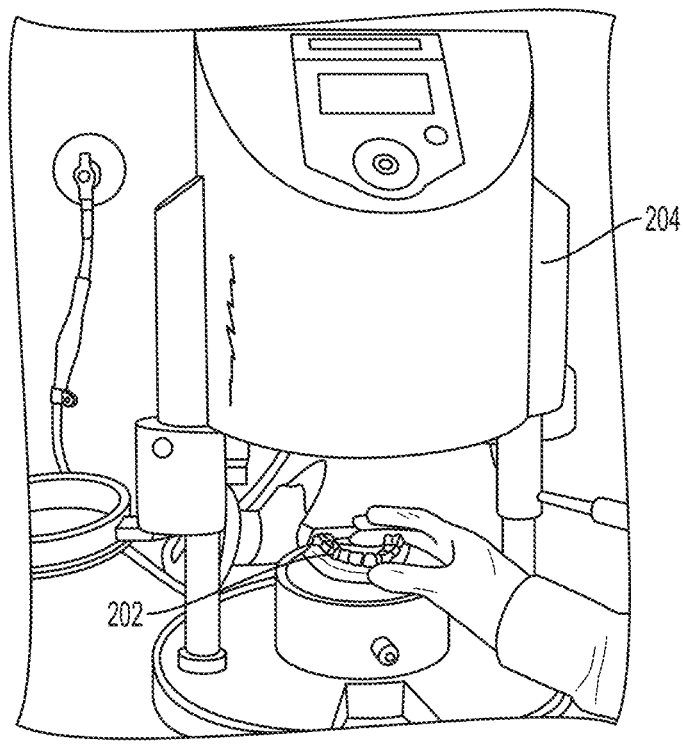
FIG. 2A shows a step of making invisible aligner trays in which a dental model is placed into a machine.
Figure 2B:
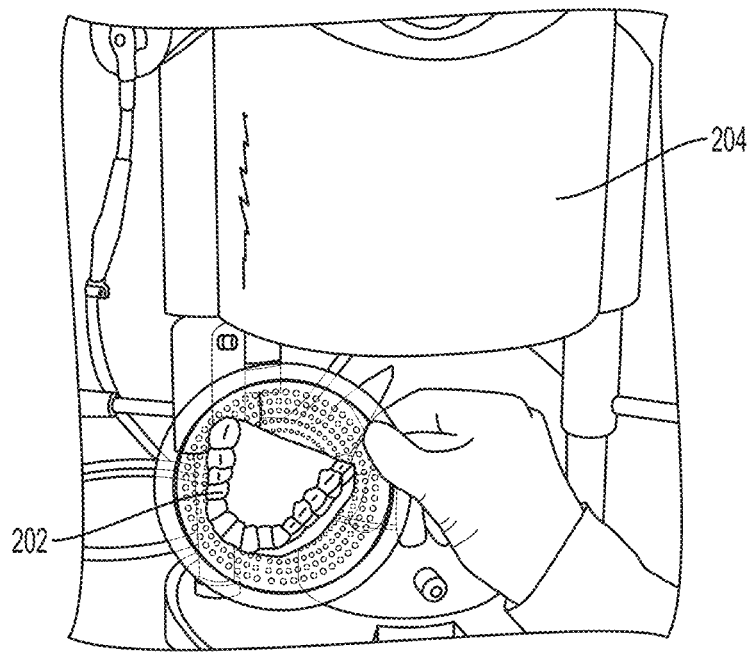
FIG. 2B shows a step in which the dental model is removed from the machine.
Figure 2C:
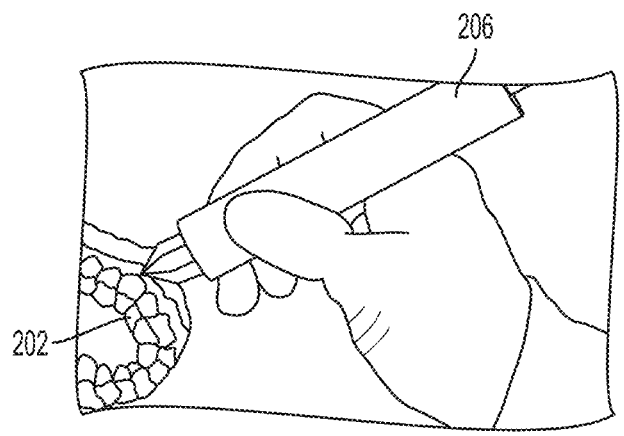
FIG. 2C shows a step of trimming the plastic of the aligner tray using a heating knife.
Figure 2D:
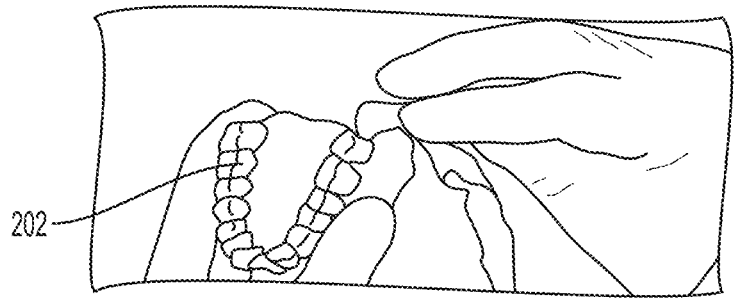
FIG. 2D shows a step of peeling the aligner tray from the dental model.
Figure 2E:
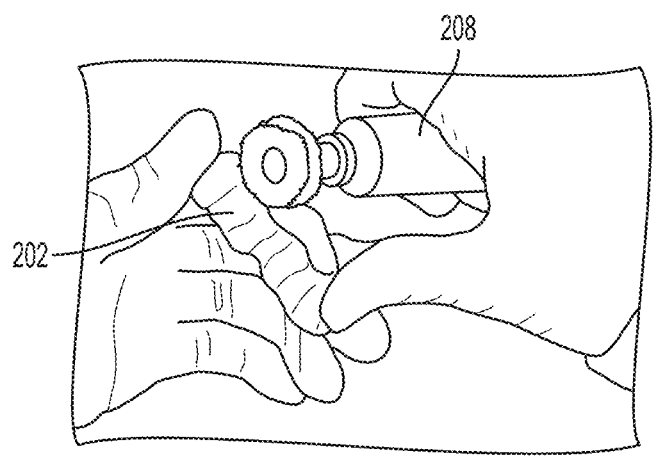
FIG. 2E shows a step of polishing the aligner tray.

The above incorporated application Ser. No. 16/610,799 published as US Patent Publication US 2021/0282900 entitled "Clear Plastic Aligner Protrusions For Anterior Or Open Bite Treatment And Mattress Plastic Material For Invisible Aligners", describes protrusions or holes with jagged edges formed on the lingual side of an invisible aligner tray which are "star shaped" protrusions that were then punctured which address the anterior open bite malocclusion issue described above, in which there is provided irritating means to remind the tongue to stay back behind the teeth when using aligner trays, such as the clear Invisalign® aligner. The irritating means inflict minor pain on the tongue causing it to retract, thus preventing it from thrusting against the front incisors and applying intrusion force to the front incisors.

However, in patients with open bite, the tongue is anteriorly positioned frequently between the anterior dentition (teeth) intruding them, that is, pushing them upward and vertically apart into an open bite. This results in poor chewing function and it is resistant to bite closure anteriorly because the tongue, being the strongest muscle in the body, thrusts between the upper and lower teeth.

This is because the strong tongue positions itself anteriorly (forward) up to 1,000 times/day when swallowing, chewing and speaking, and has been found to generate a large maximal anterior force of up to 1,500 gms.

Notably, embodiments of a the present disclosure, particularly as illustrated in FIGS. 9-29 describe aligner tongue trainers that include two distinct component parts. The first component part is a protrusion of generally elliptical dome geometry or other shapes as illustrated in the drawings including FIGS. 9-29. The second component part is a separate component part of punctured shards through the protrusion.

In some embodiments, the two components are integrally formed by the puncturing. In other embodiments, other means of forming the second component.

In the depicted embodiments, the second component or part is like a small "crown" on top of a larger diameter protrusion. This latter crown of shards or second component part (e.g., component 2902 in FIG. 29) keeps the tongue retracted. The first component part (e.g., component 2904 in FIG. 29) serves to move the shards closer toward the tongue. In some embodiments, the shards can be produced additionally on the flat surface of the aligner as well.

Figure 23:
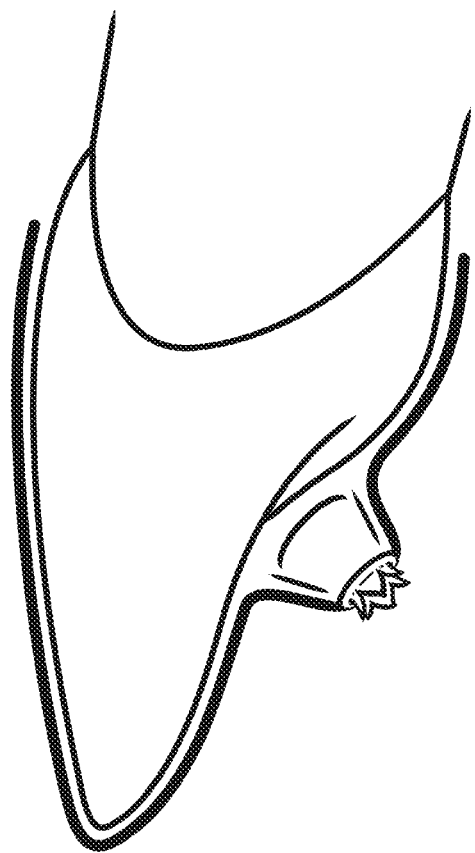
FIG. 23 depicts a side view of a longer, triangular-shaped protrusion as a component part of the aligner.
Figure 23:
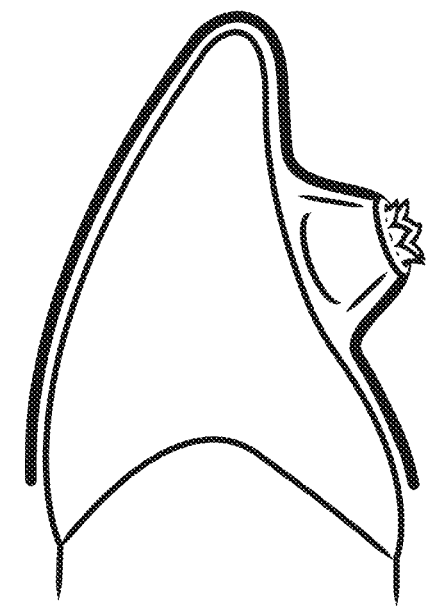
Figure 24:
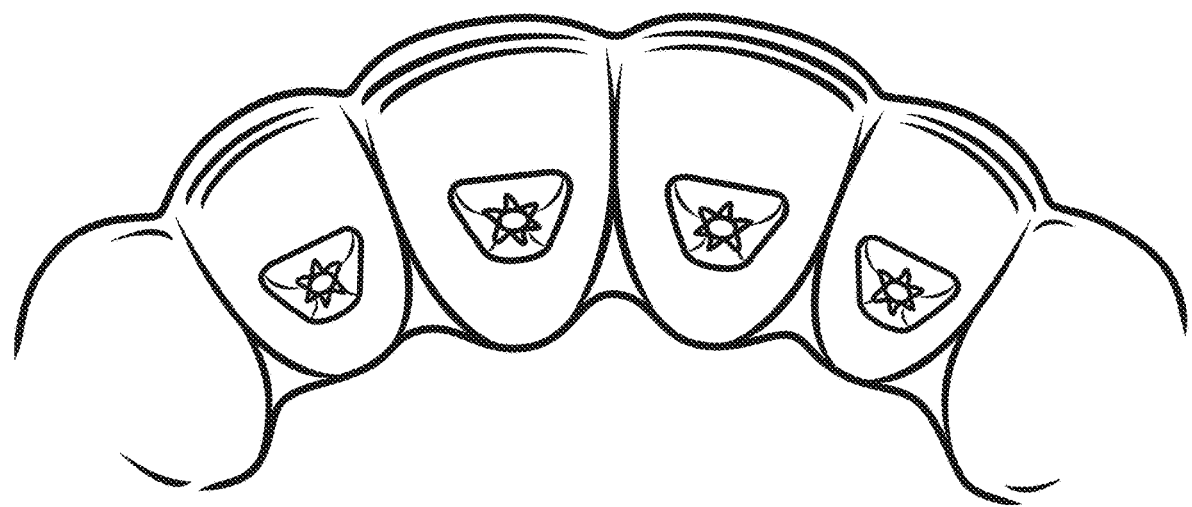
FIG. 24 depicts a palatal view of a longer, triangular-shaped protrusion as a component part of the aligner.

In some embodiments, the specific protrusions in FIGS. 23-24 are of greater lengths of protrusions, compared to the ellipticals, and again more prominent toward the tongue that then again, are punctured for the component part 2 of the more prominently positioned shards, namely leaving more prominently positioning shards of plastic to remind the tongue to retract.

Figure 5A:
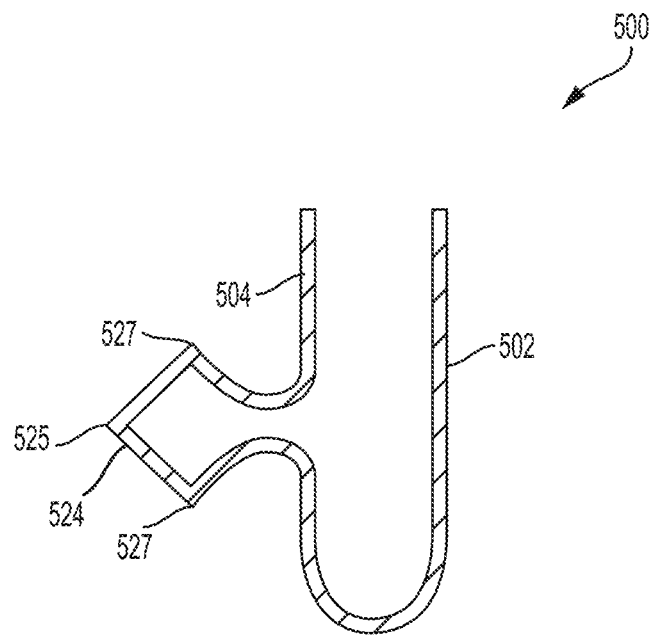
FIG. 5A is a cross-sectional view through an upper incisor portion of an upper aligner tray with protrusions having a diamond-shaped configuration, in accordance with yet another embodiment of the present invention

Variations of the embodiments in FIGS. 23-24 may include as a first component part, longer protrusions which are one or more of triangular-shaped protrusion, diamond shaped protrusions similar to the embodiment depicted in FIG. 5A, trapezoidal-type protrusions, cone-shaped protrusion, or square-type protrusions. As would be appreciated by a person of skill in the art, a variety of other shaped protrusions are possible.

These are greater lengths of protrusions, compared to the elliptical components, and again more prominent toward the tongue that then again, are punctured for the second component part of the more prominently positioned shards, namely leaving more prominently positioning shards of plastic to remind the tongue to retract.

Figure 25:
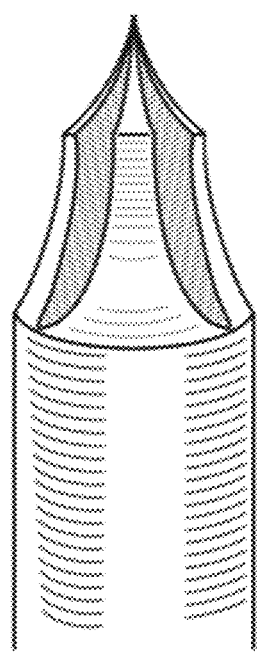
FIG. 25 depicts a puncturing tool device with four sided sharp edges or sides is used (similar to a star-shaped screwdriver head)

FIG. 25 depicts a puncturing tool device with four sided sharp edges or sides is used (similar to a star-shaped screwdriver head).

Figure 26:
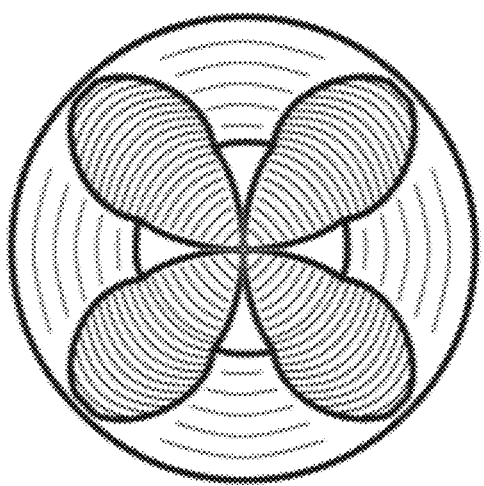
FIG. 26 shows a top view of the 4-edges of the same tool of FIG. 25.

FIG. 26 shows a top view of the 4-edges of the same tool.

Figure 27:
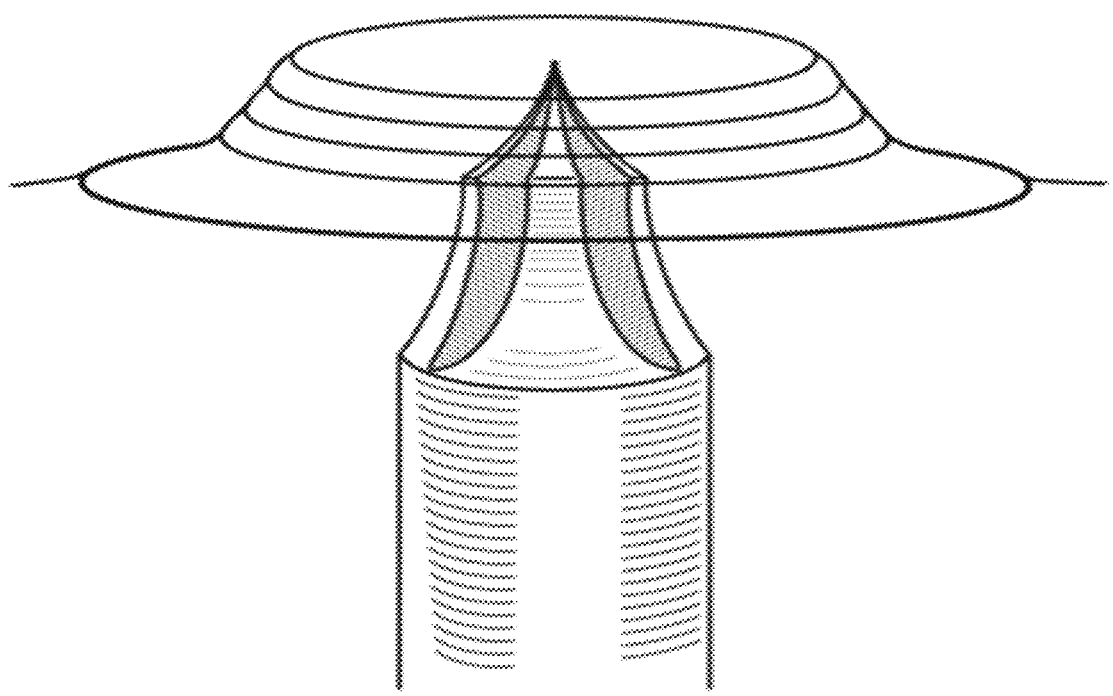
FIGS. 27-28 depict elliptical protrusions at various stages of engagement with the puncturing tool device of FIG. 25 in order to produce a greater number of shards to remind the strong tongue to stay retracted.
Figure 28:
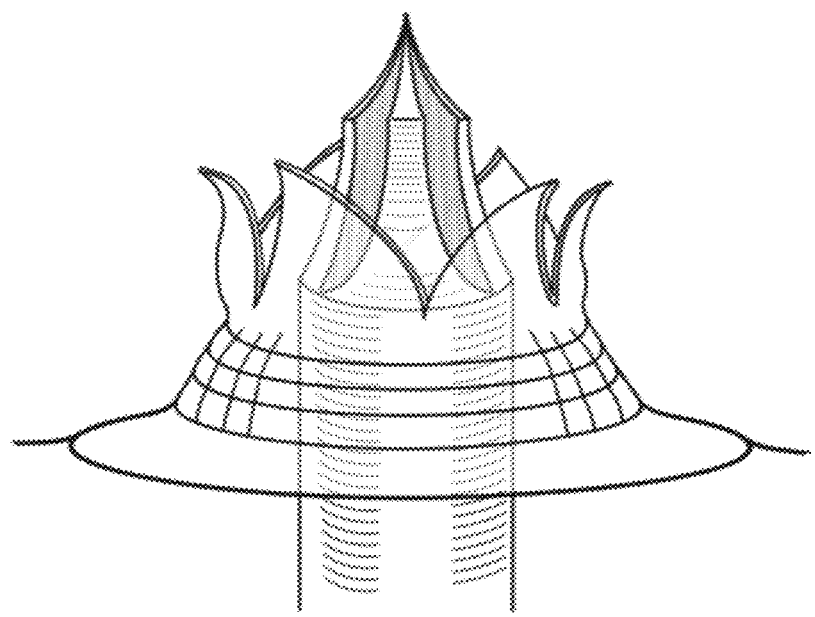
Figure 29:
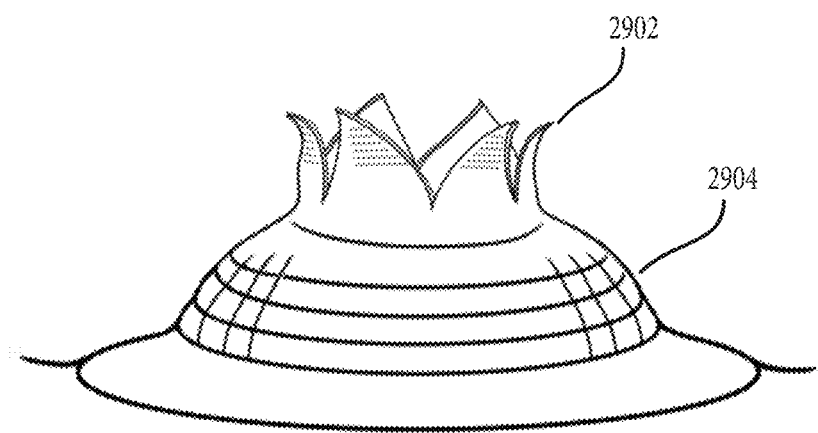
FIG. 29 depicts an example of a resulting protrusion having a first protrusion component and a second protrusion component.

FIGS. 27-29 depict a component in the form of elliptical protrusions that are configured with a puncturing tool device having four sided sharp edges or sides (similar to a star-shaped screwdriver head) in order to produce a second component part in the form of a greater number of shards to remind the strong tongue to stay retracted.

FIG. 26 shows a top view of the 4-edges of the same tool of FIG. 25.

FIGS. 27-28 depict elliptical protrusions at various stages of engagement with the puncturing tool device of FIG. 25 in order to produce a greater number of shards to remind the strong tongue to stay retracted.

FIG. 29 depicts an example of a resulting protrusion a first protrusion component 2904 and a second protrusion component 2902.

Figure 3A:
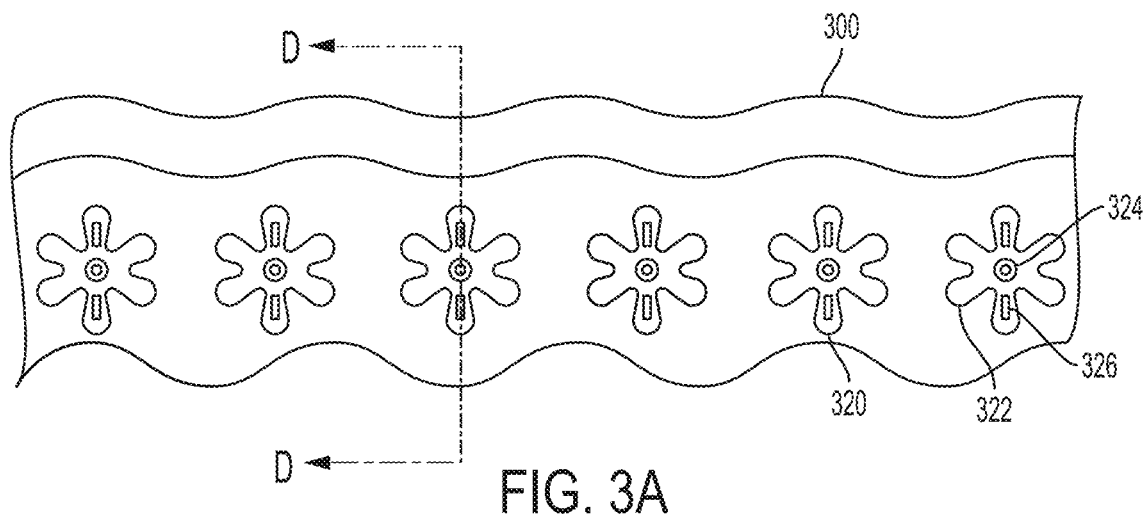
FIG. 3A is a three-quarter view of an upper aligner tray with six protrusions having a star configuration in accordance with the embodiment of the present invention.
Figure 3B:
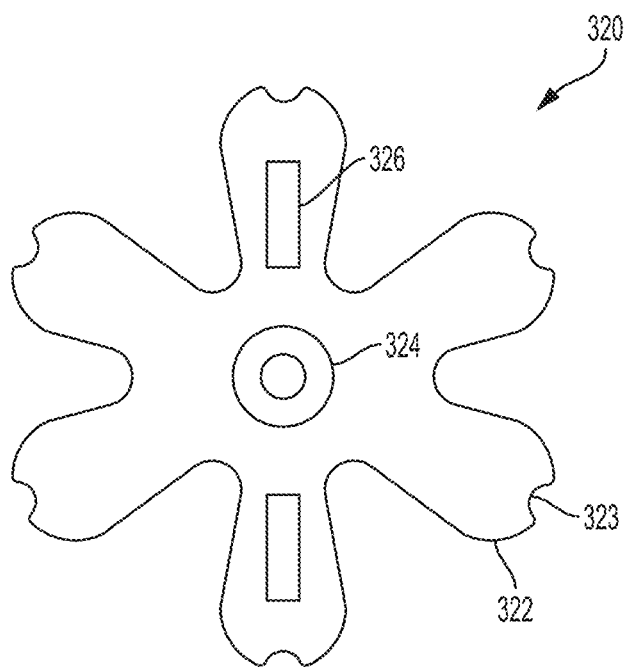
FIG. 3B is an enlarged front view of one of the six protrusions of FIG. 3A.
Figure 3C:
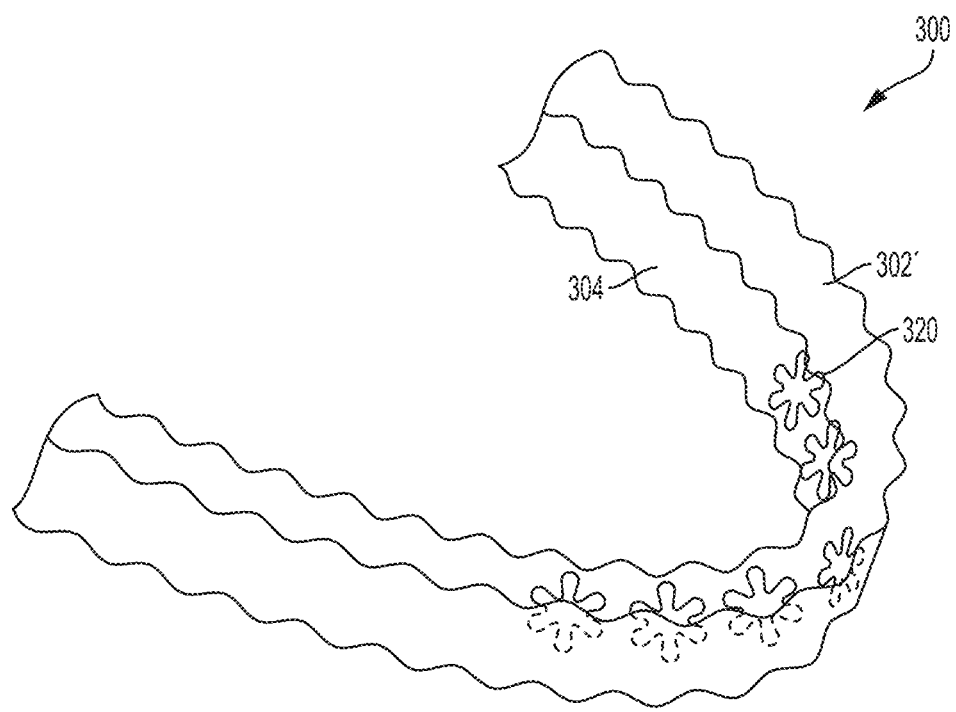
FIG. 3C is a perspective gingival view of the upper aligner tray of FIG. 3A.
Figure 3D:
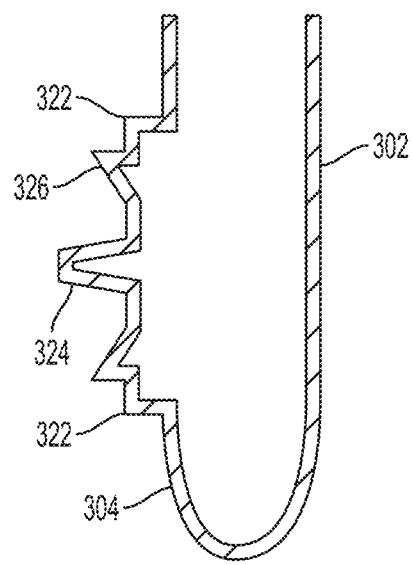
FIG. 3D is a cross-sectional view through an upper incisor portion of the aligner tray of FIG. 3A taken at line D-D.

With reference to FIGS. 3A, and 3C-3D there is shown an upper Invisalign® aligner tray 300 having a labial-buccal side 302, a lingual side 304, and a socket area shaped to receive a patient's teeth formed between the labial-buccal side 302 and the lingual side 304. Lingual protrusions 320 having a star configuration are formed in the lingual side 304 of tray 300 in a direction facing the tongue. The star protrusions 320 may comprise six wing members 322 extending radially from a center thereof. Other numbers of wing members such as 3, 4, 5, 7 or 8 may also be used. In one embodiment, a notch 323 is formed on the outwardly facing surface of the wing members. The star protrusion also features a horn-shaped member 324 at a center thereof, the horn member extending substantially lingually towards the tongue of a patient wearing the aligner tray. The horn-shaped member 324 extending lingually towards the tongue. In another embodiment, at least one wedge member 326 is formed on the lingual surface of at least one wing member 322. The star protrusion shown in FIGS. 3A-3D features two wedge members 326. The protrusions 320 work by negative conditioning. When the tongue touches the protrusions, it is irritated as it comes in contact with one or more of: the horn-shaped member, the wedge members, and the wing members. As a result, the tongue will retract allowing the corresponding linear tray to extrude the upper and lower incisors (often with labial clear attachment resins). More specifically, if the tongue touches the protrusions 320 in the labial-lingual direction, the horn 324 irritates the tongue causing it to retract. The wedge members 326 provide additional irritation to the tongue causing it to retract. The wing members 322 and the notches formed thereon serve to irritate the tongue in the mesio-distal direction particularly if the tip of the tongue is between two star protrusions. Advantageously, the tongue retracts and does not exert intruding forces on the upper or lower incisors.

Figure 4A:
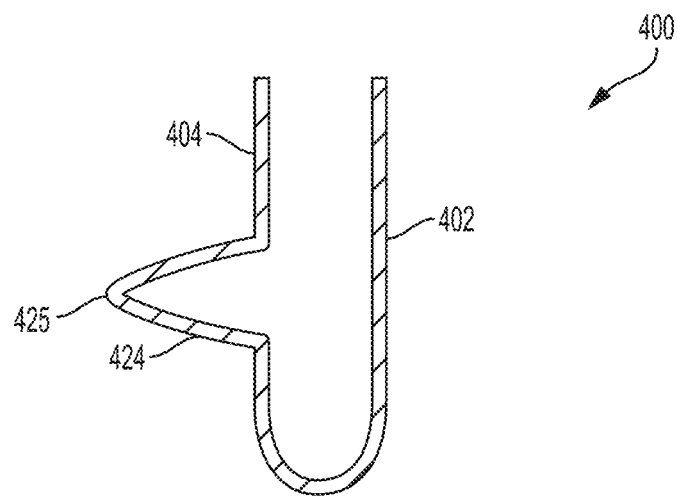
FIG. 4A is a cross-sectional view through an upper incisor portion of an upper aligner tray with protrusions having a cone-shaped (or horn) configuration, in accordance with another embodiment of the present invention.
Figure 4B:
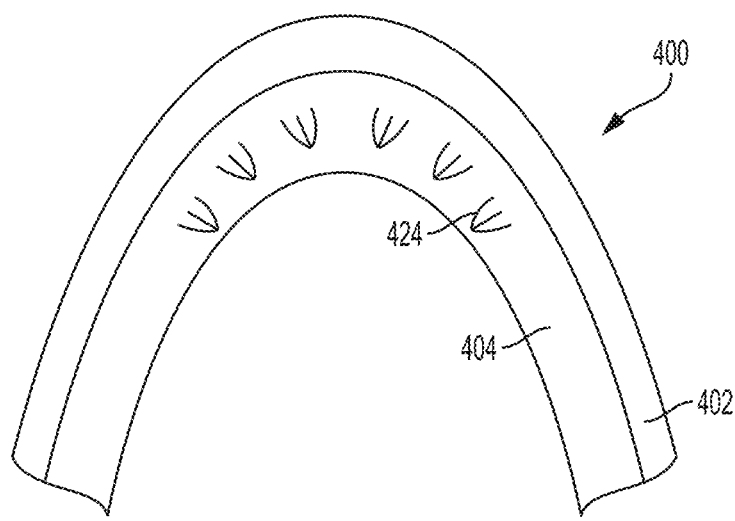
FIG. 4B is a palatal view of the aligner tray of FIG. 4A showing six protrusions having a cone-shaped configuration.

FIG. 4A is a cross-sectional view through an upper incisor portion of an Invisalign® aligner tray 400 having a labial side 402, a lingual side 404, and a socket area shaped to receive a patient's teeth formed between the labial-buccal side 402 and the lingual side 404. A cone-shaped protrusion 424 is formed on the lingual surface 404 with the apex 425 thereof facing away from the lingual surface 404. FIG. 4B is a palatal view of an aligner tray showing six cone-shaped protrusions 424 each having a lingual-facing apex 425, in accordance with another embodiment of the present invention. The cone-shaped protrusions 424 are simpler than the star configuration of FIGS. 3A-3D, and are easier to form on a dental model used in making the aligner tray.

Figure 5B:
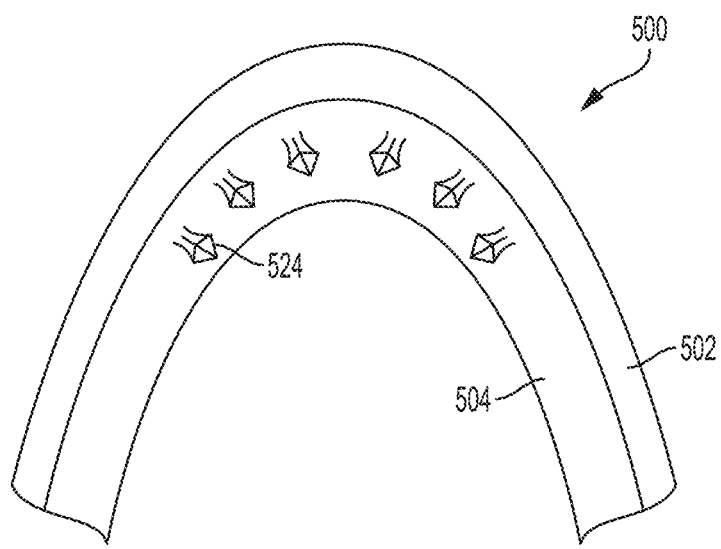
FIG. 5B is a palatal view of the aligner tray of FIG. 5A showing six protrusions having a diamond-shaped configuration.

In yet another embodiment, FIGS. 5A-5B show an aligner tray 500 having a labial side 502, a lingual side 504, and a socket area shaped to receive a patient's teeth formed between the labial-buccal side 502 and the lingual side 504. Diamond-shaped protrusions 524 are formed on the lingual surface 504 facing the tongue. The diamond shaped protrusions 524 are simple to form on a dental model, and advantageously have multiple pointed edges 525 and 527 which can irritate the tongue from multiple directions. Central lingual-facing pointed edge 525 irritates the tongue if it is advanced towards the protrusion from a straight lingual direction. Side pointed edges 527 serve to irritate the tongue if it approaches the protrusion 524 from the side, or if the tip of the tongue is between two adjacent diamond protrusions 524. Advantageously the tongue retracts thus the intruding force thereof on the incisors is averted.

The protrusions 320, 424, and 524 may be formed on the aligner tray so that they are positioned near the middle or lower third of the incisors to allow the incisors to re-extrude with aligner therapy. Aligners 300, 400, and 500 having protrusions 320, 424, and 524 respectively may be used in children, teens or adults as well to restrict and retract tongue thrusting or anterior tongue positioning.

The protrusions on the aligners may be ordered or made in a lab. Between 1 and 28 of the protrusions may be added to aligner trays. It is customary to have six protrusions per aligner as depicted in FIGS. 3A, 3C, 4B and 5B;

Usually, there are a total of 12 protrusions, with 6 at the lingual side of each of the upper and lower front teeth from canine to canine. However, when there are additional lateral open bites the protrusions may be placed from the palatal of the upper molars forward to the premolars as well as the incisors. This may occur for both the upper and lower aligners for a maximum total of 28 protrusions intraorally on all the dentitions, for example.

The protrusions presented above are formed in the dental model over which the aligner tray is formed. This may be done in software after impressions of the patient's teeth are taken and fed into a computer for generating a dental model. Prior to generating the model, the impressions may be modified to add star, cone-shaped, diamonds-shaped, or any other suitably shaped protrusions.

Figure 6A:
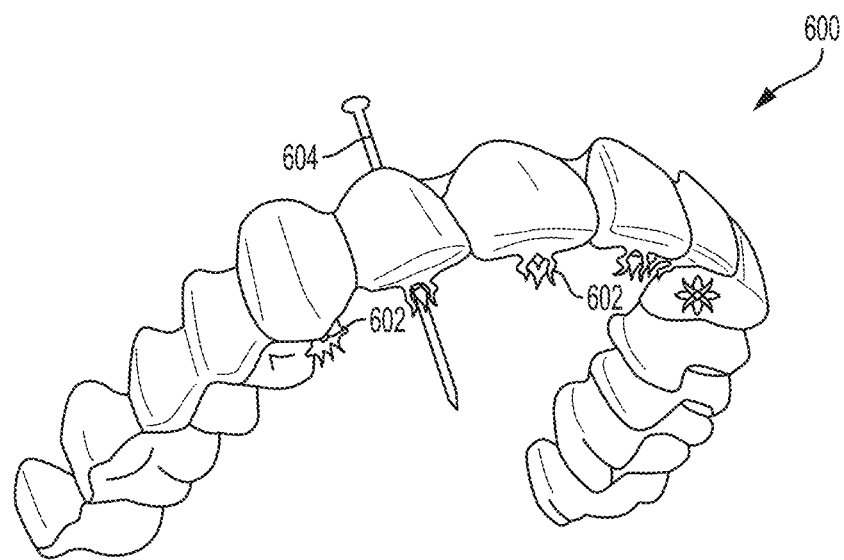
FIG. 6A is a perspective mesial-occlusal view showing the process of puncturing holes on the lingual side of the anterior portion of an upper aligner tray using a pin.
Figure 6B:
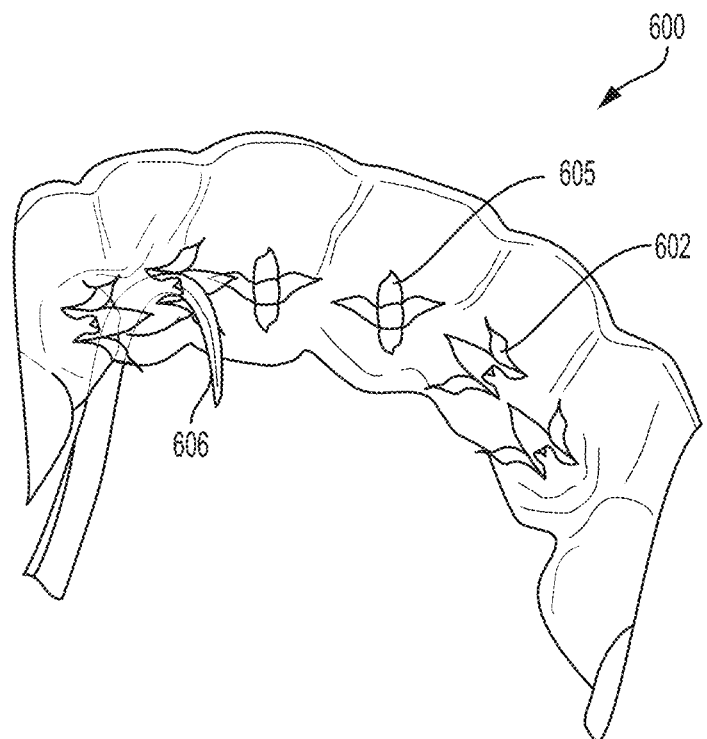
FIG. 6B is a partial perspective mesial-occlusal view showing the process of puncturing holes on the lingual side of the anterior portion of an upper aligner tray using a dental tool.
Figure 6C:
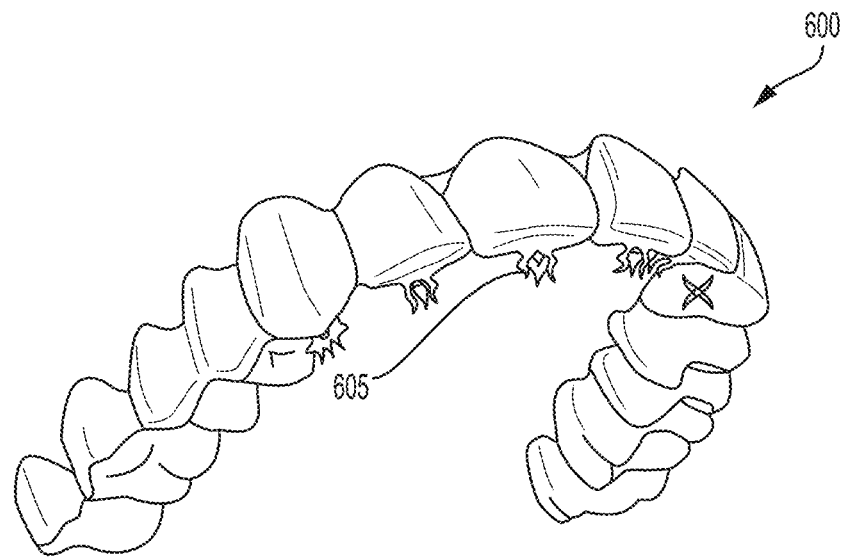
FIG. 6C is a partial perspective view showing holes formed on an invisible aligner tray.
Figure 6D:
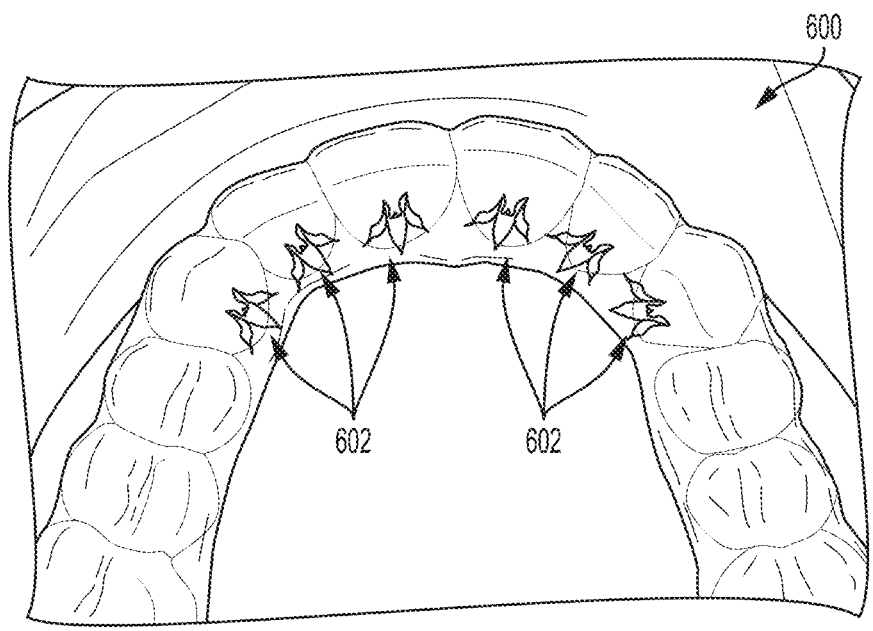
FIG. 6D is a different partial perspective view showing holes formed on the invisible aligner tray.
Figure 6E:
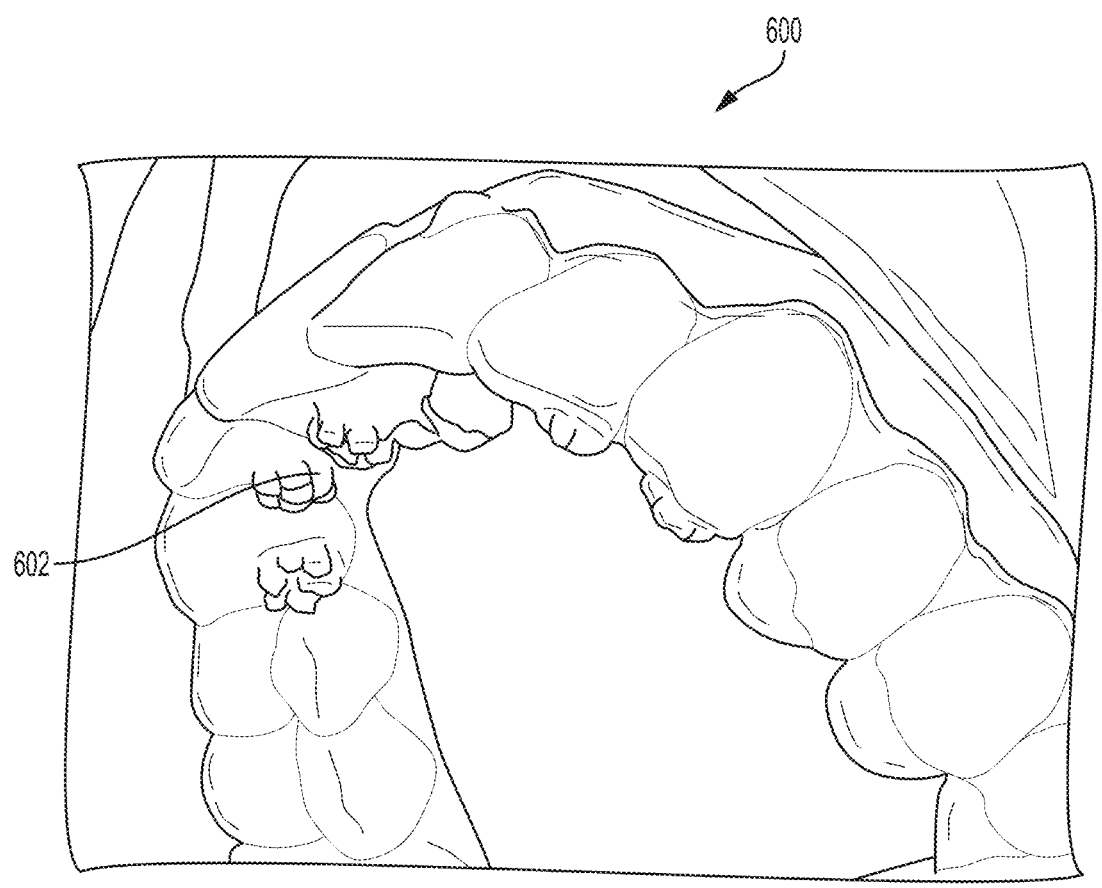
FIG. 6E is another partial perspective view showing holes formed on the invisible aligner tray.

In another embodiment, another modification to the invisible aligner trays is presented with reference to FIGS. 6A-6E. An invisible aligner tray 600 is punctured either with a pin 604 as shown in FIG. 6A, or with a dental tool 606 as shown in FIG. 6B. The puncturing is done in the lingual direction in the lingual side of the aligner tray. As a consequence holes or apertures 602 are formed. The apertures 602 are surrounded by aligner material having jagged edges 605 as a result of the puncturing. The jagged edges 605 serve to irritate the tongue so it retracts and stays away from the aligner tray. Advantageously, the tongues intruding force on the front incisors is averted.

A difficulty arises when forming the protrusions in the aligners. If a stiff thermoplastic is used, the protrusions, whether star-shaped or Cone-shaped, are not formed accurately around the corresponding protrusions in the dental model. For example, difficulty may be encountered making invisible clear vacuum-formed trays to straighten teeth with standard flat clear approximately 1 mm thick Essix® material, as described above.

Figure 7A:
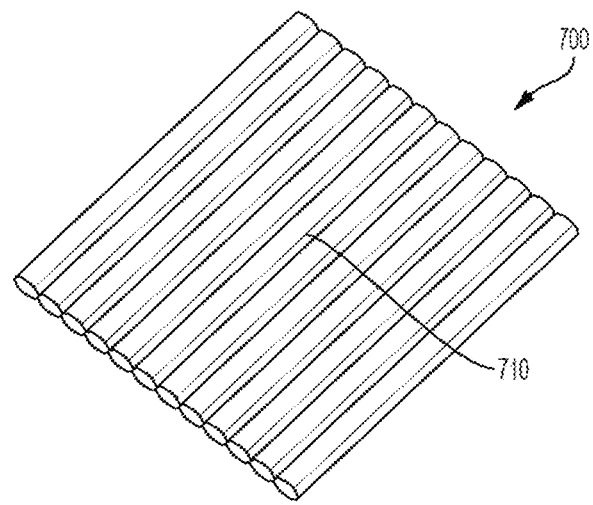
FIG. 7A is a perspective view of flexible clear corrugated aligner material that may be thermoformed in a plastic-like manner over a dental model, in accordance with an embodiment of the present invention.
Figure 7B:
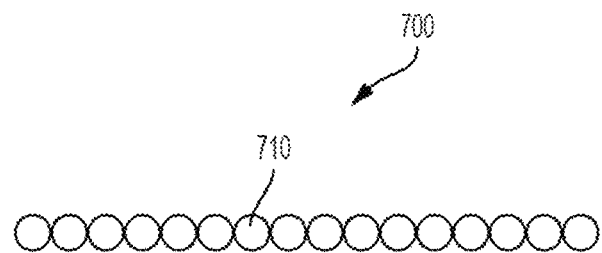
FIG. 7B is a side view of the corrugated aligner material of FIG. 7A.
Figure 8A:
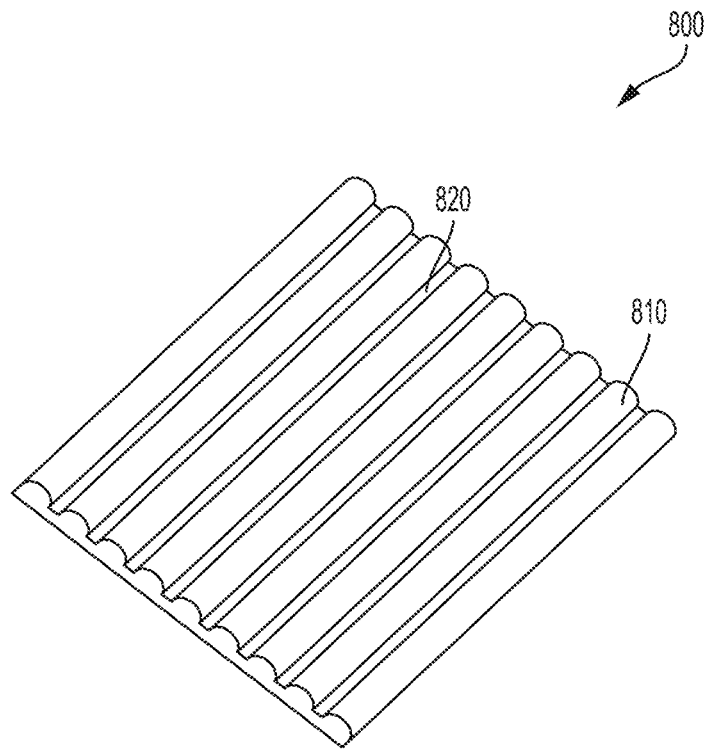
FIG. 8A is a perspective view of flexible clear corrugated aligner material, having gaps between the corrugations that can be flattened or bead-like, in accordance with another embodiment of the present invention.
Figure 8B:
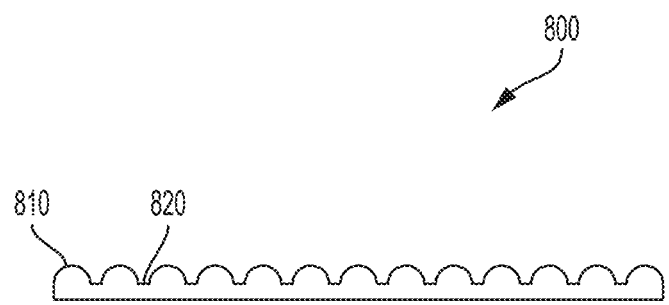
FIG. 8B is a side view of the corrugated aligner material of FIG. 8A.
Figure 9:
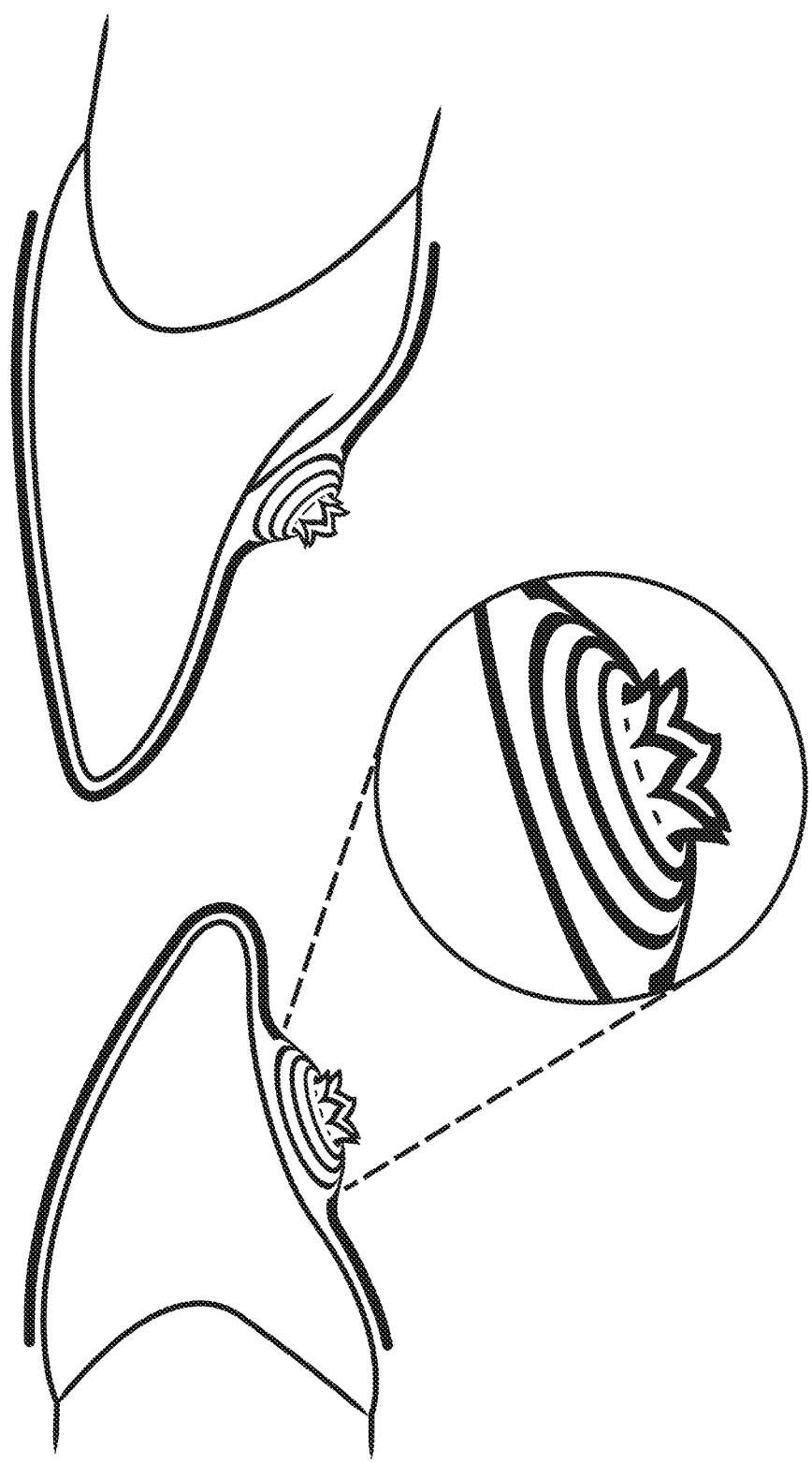
FIGS. 9-21 depict various views of embodiments of an aligner having a first protrusion component in the form of elliptical shaped domes on the lingual (tongue-side) of teeth, that are then punctured with a tool to form a second protrusion component.
Figure 10:
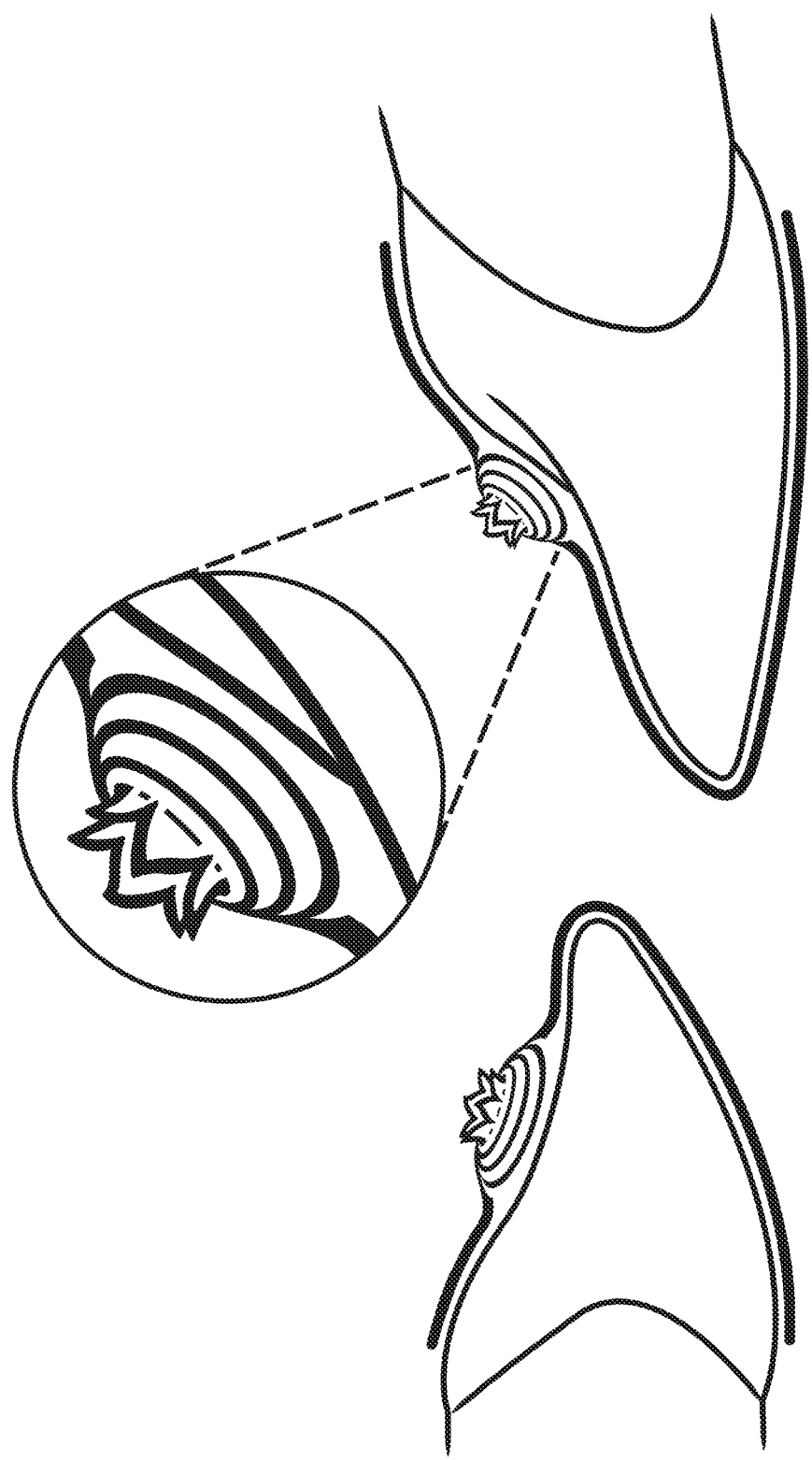
Figure 11:
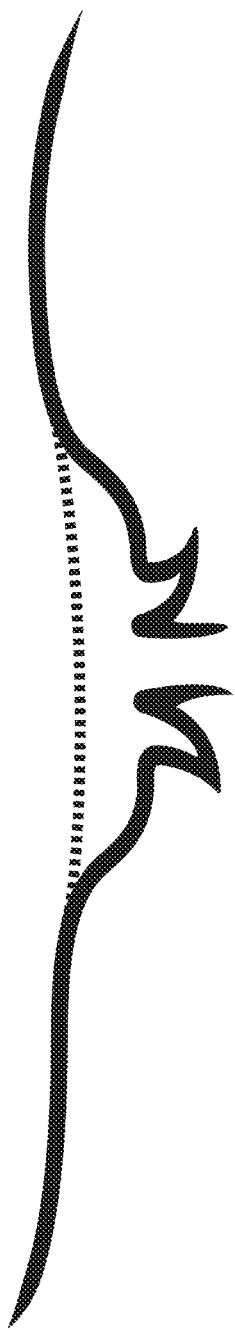
Figure 12:
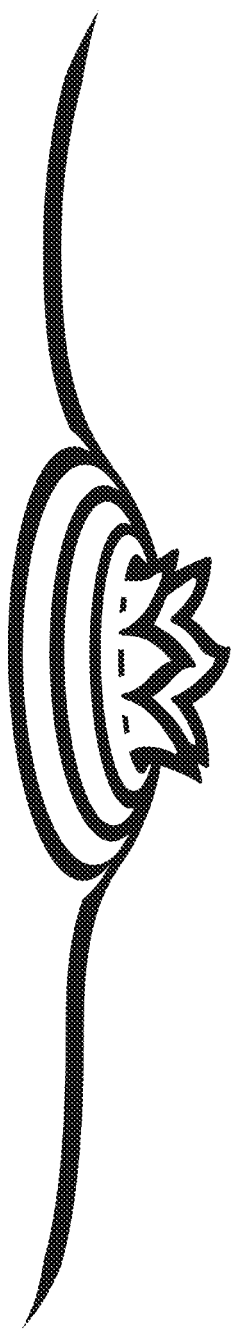
Figure 13:
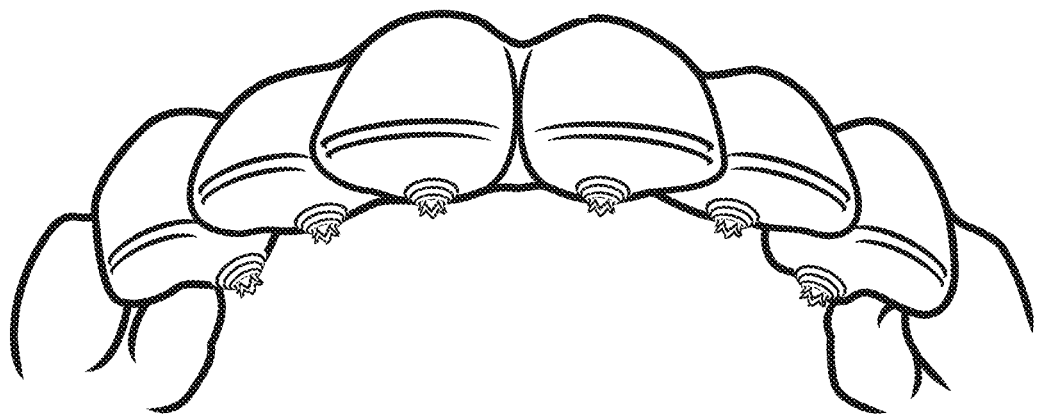
Figure 13:
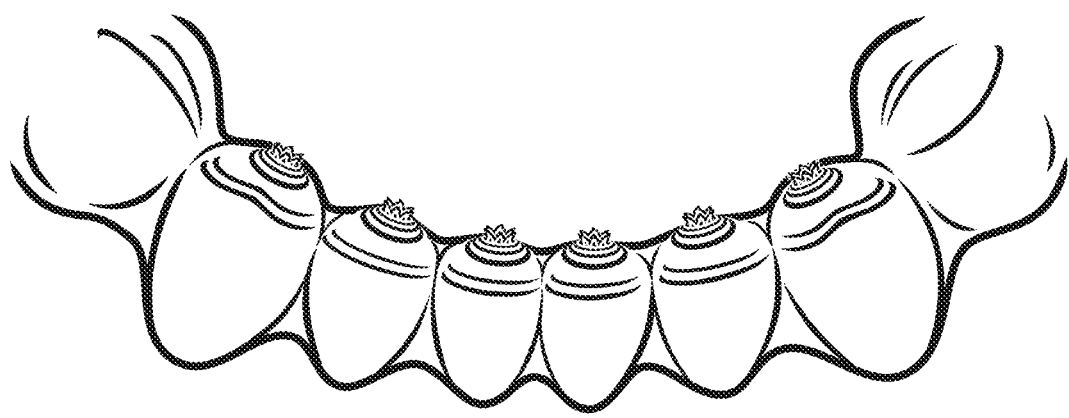
Figure 14:
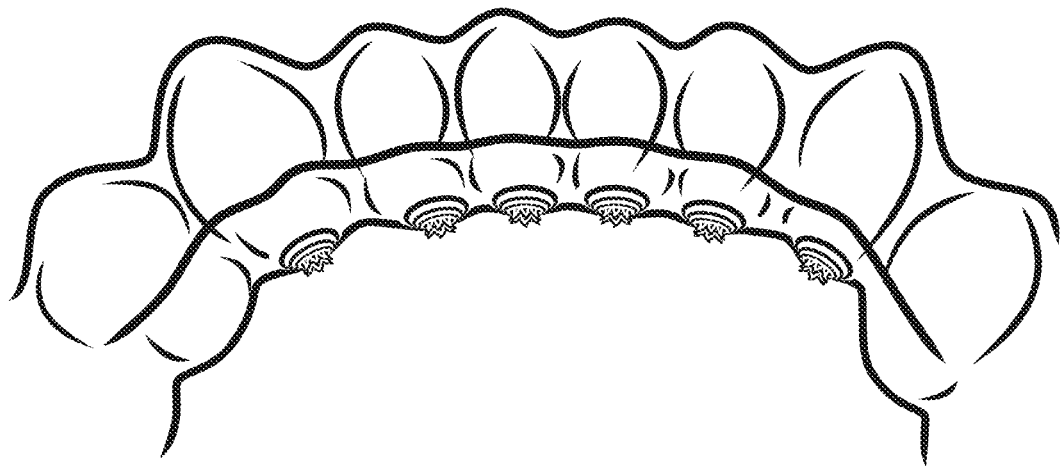
Figure 15:
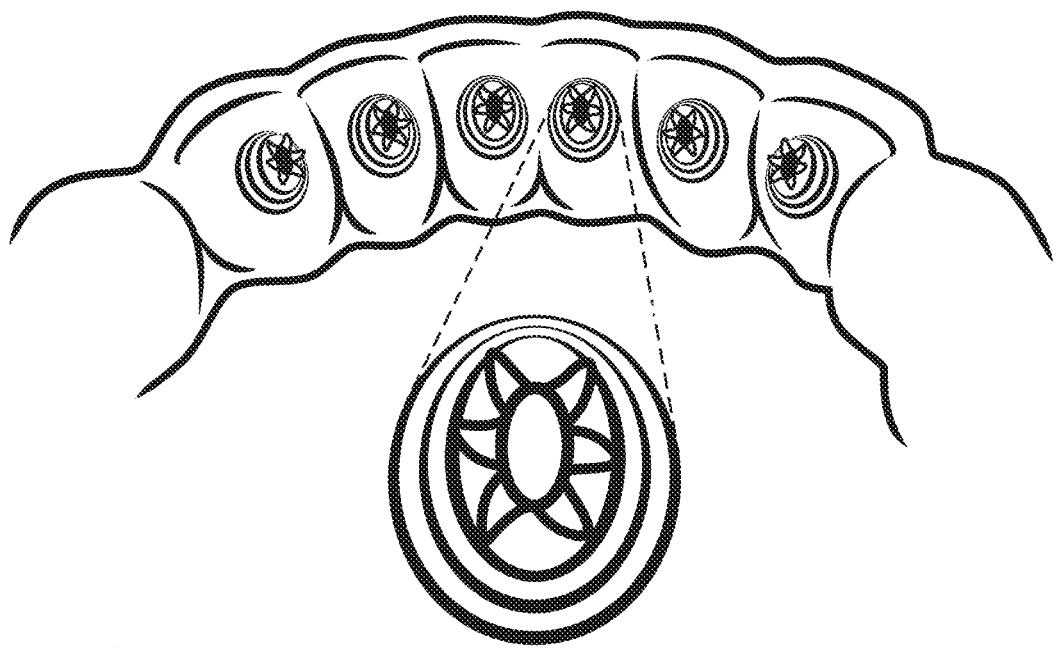
Figure 16:
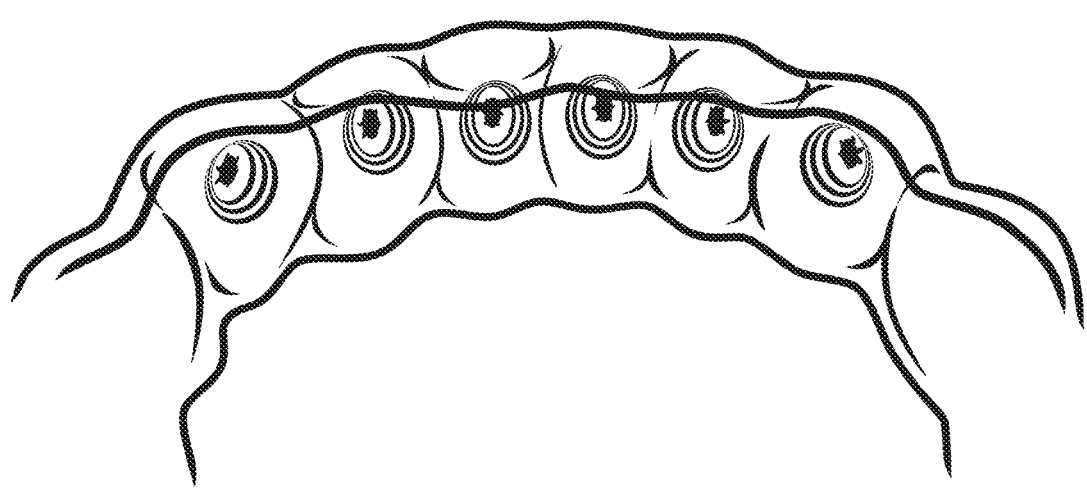
Figure 17:
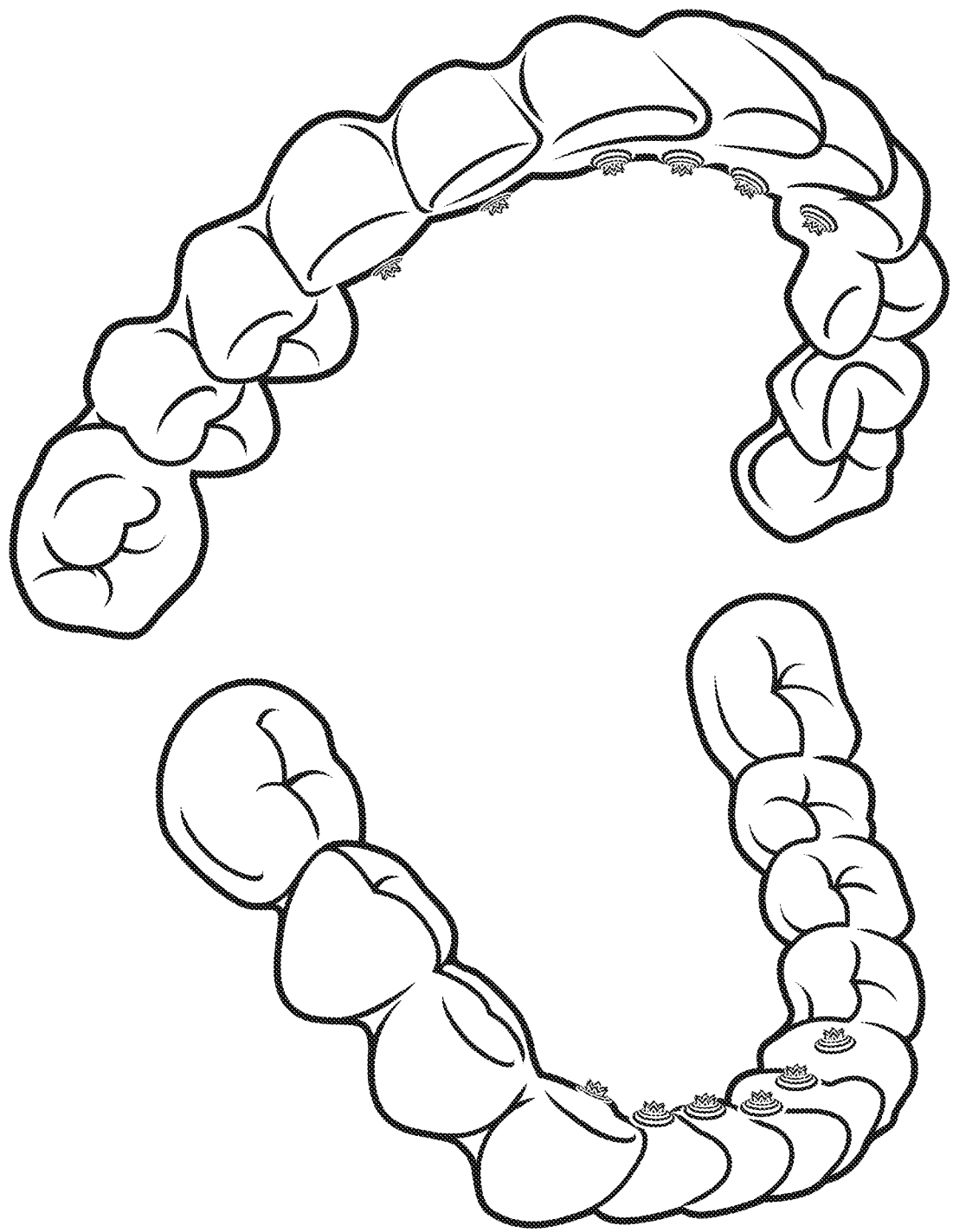
Figure 18:
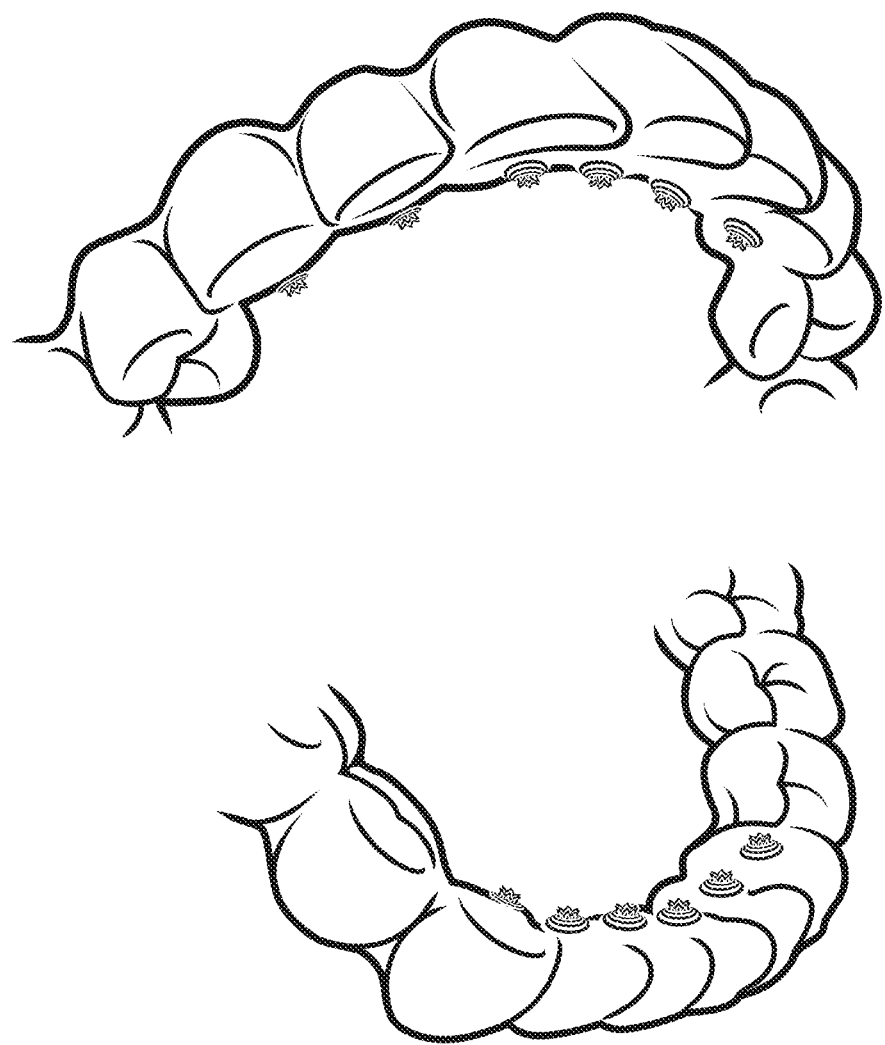
Figure 19:
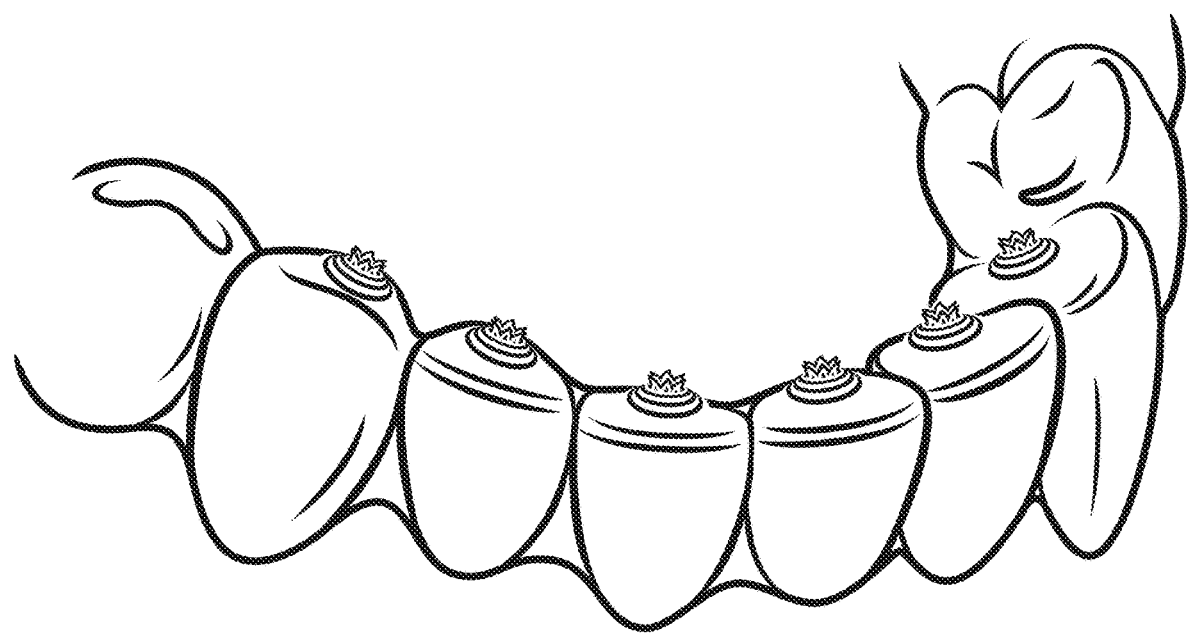
Figure 20:
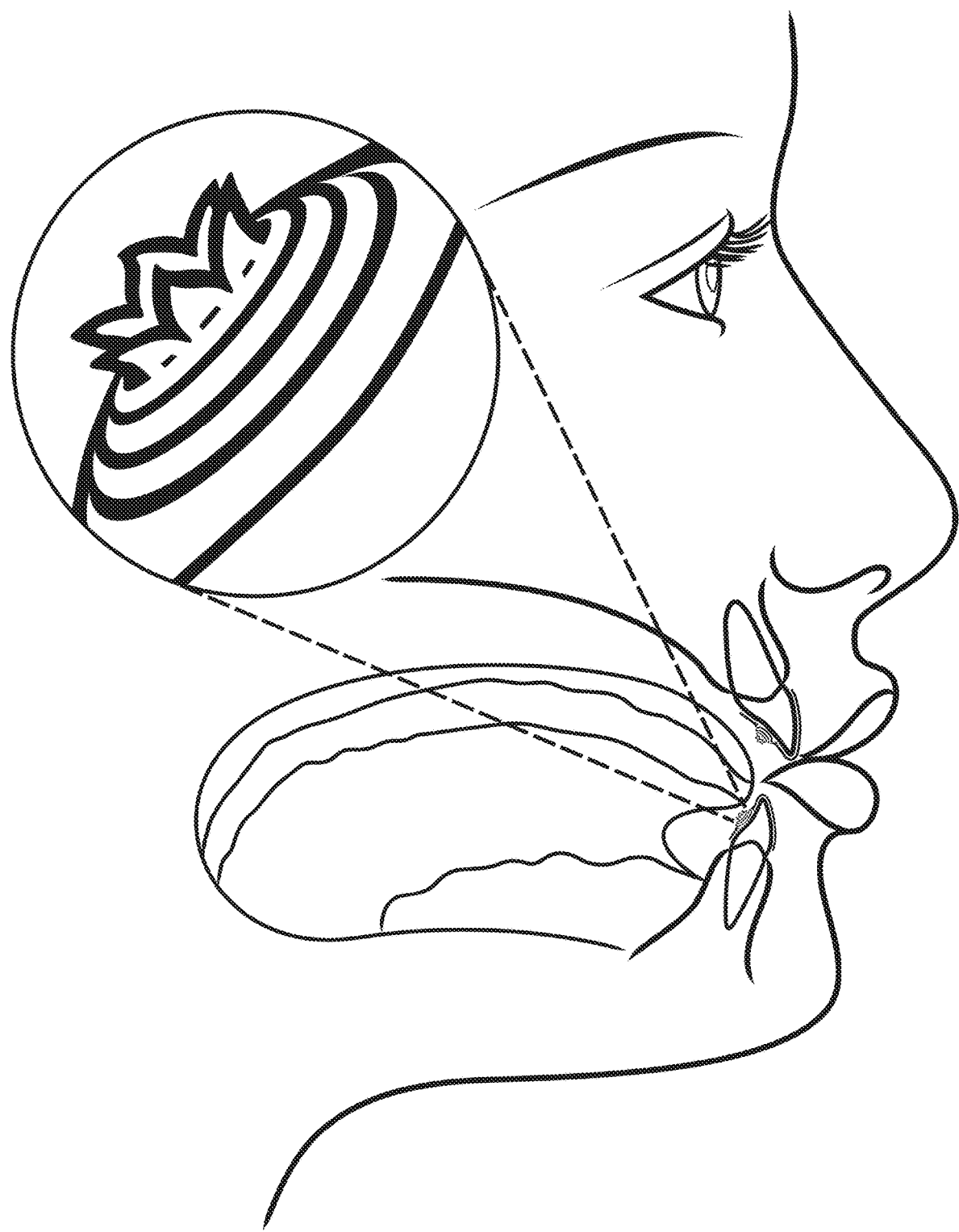
Figure 21:
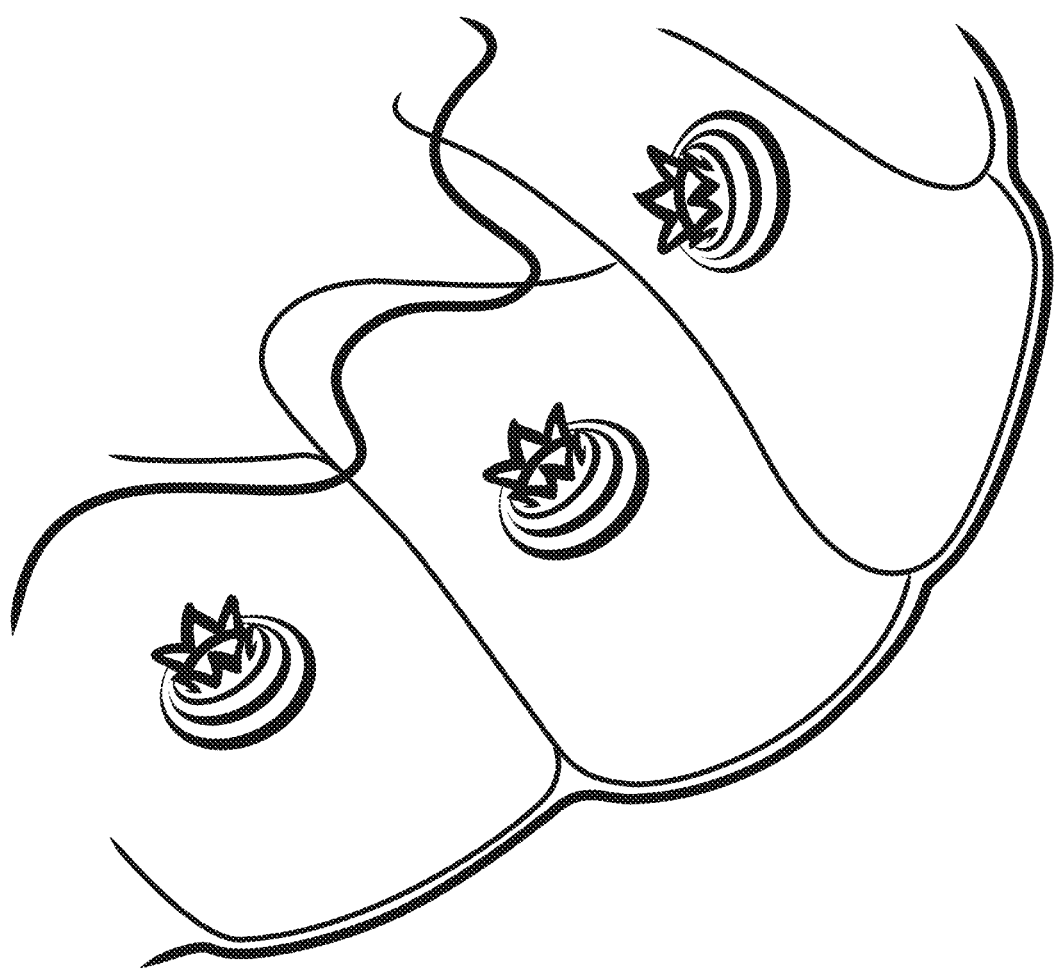
Figure 22:
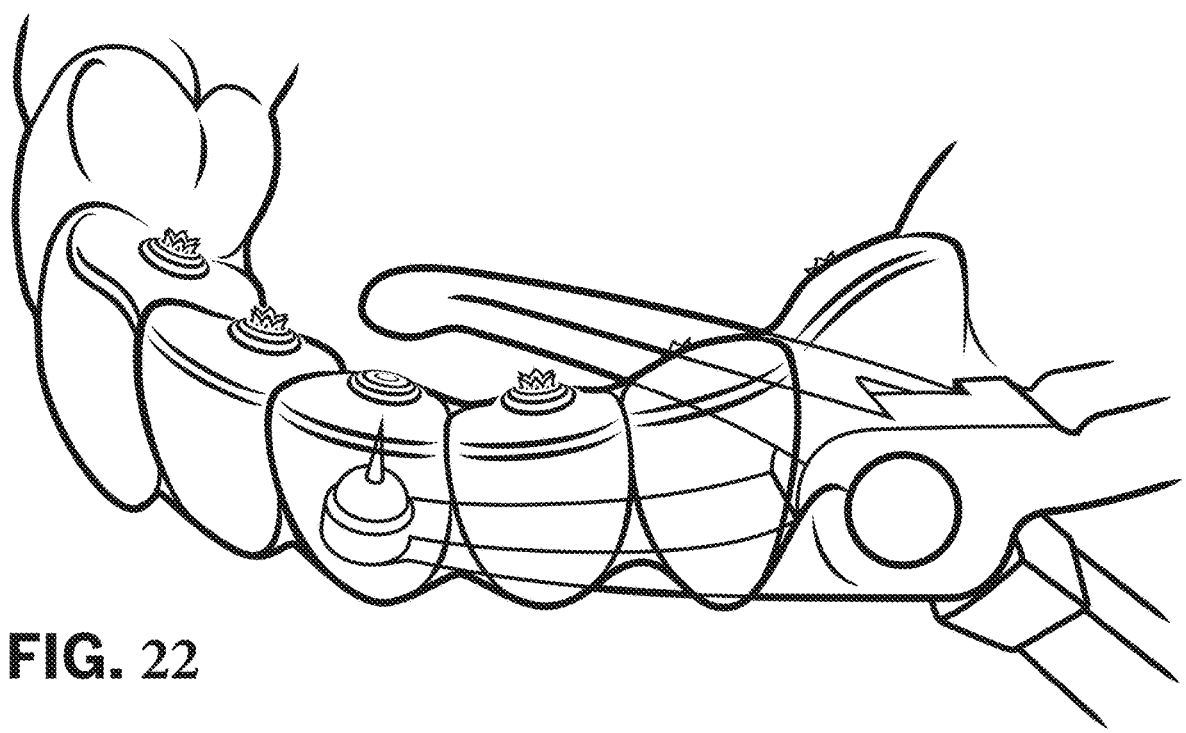
FIG. 22 depicts a tool in the form of a sharp three-sided or edged scaler plier used to puncture the elliptical shaped domes of FIGS. 9-21.

FIGS. 7A-7B and FIGS. 8A-8B depict two embodiments to address the problem caused by the standard flat confluent Essix® material being too stiff and inflexible, as mentioned above. The corrugated plastic-like material shapes provide flexibility so that the material is able to be thermal formed over resin dental models. FIG. 7A is a perspective view of a sheet of flexible clear corrugated aligner material 700 that may be thermoformed in a plastic-like manner over a dental model, in accordance with an embodiment of the present invention. FIG. 7B is a side view of the sheet of flexible material 700. Material 700 is formed of a plurality of parallel corrugations 710 joined to one another. FIG. 8A is a perspective view of an alternative embodiment of flexible clear corrugated aligner material 800, having flat, similar, and plastic-like longitudinal gaps 820 on the sheet of plastic-like material 800 separating the corrugations 810. In some embodiments as depicted in FIG. 7C the gaps may be centered like a barbell between the corrugations. The corrugations 710 and 810 may also be raised (either elliptical or rounded), or flattened before thermal forming over a resin or plaster dental model. Advantageously, this corrugated material is better suited to take the form of the protrusions formed on the dental mode, when the invisible aligner tray is formed on the dental model as explained above.

The invention claimed is:

1. An orthodontic device for anterior or lateral open bite treatment, comprising:
    a plastic aligner tray having a labial-buccal side, a lingual side, and a socket shaped to engage a patient's teeth formed between the lingual side and the labial side; and
    a first component formed on the aligner tray on the lingual side and facing the patient's tongue;
    a second component formed from the first component;
    wherein the first component is configurable to form the second component for irritating the patient's tongue for preventing the tongue from thrusting against the incisors causing intrusion, the second component comprising at least one protrusion, the at least one protrusion comprising a lingual-facing pointed edge,
    wherein the at least one protrusion is selected from the group consisting of: a star-shaped protrusion, a diamond shaped protrusion, a trapezoidal shaped protrusion, and a square shaped protrusion.

2. The orthodontic device of claim 1, wherein the star-shaped protrusion comprises a plurality of wing members extending radially from a center thereof.

3. The orthodontic device of claim 2, wherein the star-shaped protrusion comprises a wedge member on a labial surface of at least one of the plurality of wing members.

4. The orthodontic device of claim 1, wherein the star-shaped protrusion comprises a horn member at a center thereof extending substantially lingually towards the patient's tongue.

5. The orthodontic device of claim 1, wherein the at least one protrusion is diamond-shaped.

6. The orthodontic device of claim 5, wherein the diamond-shaped protrusion comprises the lingual-facing pointed edge.

7. The orthodontic device of claim 5, wherein the diamond-shaped protrusion comprises a plurality of side pointed edges.

8. The orthodontic device of claim 1, wherein the second component comprises at least one hole formed on the lingual side of the aligner tray, the at least one hole having a plurality of jagged edges.

9. A flexible clear corrugated aligner material for use in making the orthodontic device of claim 1, the material comprising a plurality of parallel corrugated sections joined to one another for providing flexibility when formed around a dental model, wherein the corrugated sections are flattened prior to thermal forming over a resin or plaster dental model.

10. A process for making a plastic aligner tray, the process comprising:
    obtaining impressions of a patient's teeth by creating an impression mold, where the impression mold is digitally scanned and feeding data corresponding to the impressions into a computer for generating a computer dental model of the patient's teeth;
    modifying the computer dental model to add a protrusion in software to the computer dental model corresponding to a first component of the aligner tray, wherein the first component is configurable to form a second component;

generating a physical dental model of a patient's teeth, including a physical protrusion corresponding to the protrusion in software;

preparing an aligner tray on the physical dental model such that the aligner tray contains the first component; and configuring the first component to add the second component.

11. The process of claim 10, wherein said configuring comprises puncturing the first component to add the second component.

12. The process of claim 11, wherein the second component comprises one or more of: star-shaped protrusions, cone-shaped protrusions, diamond-shaped protrusions, trapezoidal protrusions, triangular-shaped protrusions or square-shaped protrusions.

* * * * *